United States Patent [19]

Tsuyama et al.

[11] Patent Number: 5,297,662
[45] Date of Patent: Mar. 29, 1994

[54] TRACTION CONTROL SYSTEM FOR VEHICLE

[75] Inventors: Toshiaki Tsuyama; Toru Onaka; Kazutoshi Nobumoto; Fumio Kageyama; Makoto Kawamura, all of Hiroshima, Japan

[73] Assignee: Mazda Motor Corporation, Hiroshima, Japan

[21] Appl. No.: 718,638

[22] Filed: Jun. 21, 1991

[30] Foreign Application Priority Data

Jun. 21, 1990 [JP] Japan .................. 2-163364
Sep. 18, 1990 [JP] Japan .................. 2-247919

[51] Int. Cl.$^5$ ............................ B60K 41/20
[52] U.S. Cl. ......................... 192/1.22; 180/197; 192/1.23
[58] Field of Search .............. 192/1.22, 1.23, 1.24; 123/336; 180/197

[56] References Cited

U.S. PATENT DOCUMENTS 4,969,102 11/1990 Tamura et al. .............. 180/197 X
5,124,922 6/1992 Akiyama .................... 180/197 X

FOREIGN PATENT DOCUMENTS 63-109248 5/1988 Japan .
0216036 8/1989 Japan .................... 123/336

Primary Examiner—Rodney H. Bonck
Attorney, Agent, or Firm—Sixbey, Friedman, Leedom & Ferguson

[57] ABSTRACT

A traction control system for a vehicle has a sub-throttle valve provided in an intake passage of the engine in series to a main throttle valve which is operatively connected to an accelerator pedal to open and close in response to operation of the accelerator pedal. An engine output controller controls opening of the sub-throttle valve to control the output of the engine so that the slip value of the driving wheels converges on a target slip value. The engine output controller once moves the sub-throttle valve to an initial opening when the slip value of the driving wheels exceeds the target slip value and then controls the opening of the sub-throttle valve to control the output of the engine so that the slip value of the driving wheels converges on a target slip value. The initial opening is set to be a fixed value when the opening of the main throttle valve is not larger than a predetermined opening and to be substantially equal to the opening of the main throttle valve when the opening of the main throttle valve is larger than the predetermined opening. The fixed value is not smaller than the predetermined opening of the main throttle valve.

6 Claims, 7 Drawing Sheets

TRACTION CONTROL SYSTEM FOR VEHICLE

BACKGROUND OF THE INVENTION

1. Field of the Invention

This invention relates to a traction control system for a vehicle which controls the slip of the driving wheels of a vehicle.

2. Description of the Prior Art

There has been known a traction control system for a vehicle which controls the slip of the driving wheels of the vehicle by reducing the output of the engine of the vehicle and/or applying brakes for the driving wheels. In such a traction control system, a target slip value (a target slip ratio or a target amount of slip) is determined according to the friction coefficient of the road surface and when the slip value of the driving wheel relative to the road surface exceeds the target slip value, the driving torque acting on the driving wheel is reduced by reducing the engine output torque and/or applying the brake to the wheel so that the slip value of the driving wheel relative to the road surface converges on the target slip value.

When the driving torque is reduced by reduction of the engine output torque, the reduction of the engine output torque is effected, for instance, by controlling the amount of intake air introduced into the combustion chambers of the engine through the intake passage thereof. For example, in the traction control system disclosed in Japanese Unexamined Patent Publication No. 63(1988)-109248, a sub-throttle valve is provided in the intake passage in addition to a throttle valve which is interlocked with an accelerator (will be referred to as "the main throttle valve", hereinbelow), and the opening degree of the sub-throttle valve is controlled to converge the slip value of the driving wheel on the target slip value.

In the traction control system where the driving torque acting on the driving wheels is reduced by control of the opening degree of the sub-throttle valve, the sub-throttle valve is normally held at a fully open position, and the sub-throttle valve is closed to an opening degree according to the slip value of the driving wheels relative to the road surface when the slip value of the driving wheels exceeds the target slip value. However if the sub-throttle valve is directly closed from the fully open position to the opening degree determined according to the slip value, it takes a long time and the response of the sub-throttle valve at the beginning of the traction control delays. This problem may be overcome by first moving, upon starting of the traction control, the sub-throttle valve to the opening degree corresponding to the opening degree of the main throttle valve at that time and then to the opening degree determined according to the slip value.

However, this approach gives rise to another problem that, if the opening degree of the main throttle valve upon starting of the traction control is relatively small (e.g., not larger than 50%), the amount of intake air is abruptly reduced in response to moving the sub-throttle valve to the opening degree determined according to the slip value and the vehicle cannot be properly accelerated.

SUMMARY OF THE INVENTION

In view of the foregoing observations and description, the primary object of the present invention is to provide a traction control system in which the response of the sub-throttle valve at the beginning of the traction control can be improved without giving rise to the problem that the amount of intake air is abruptly reduced in response to moving the sub-throttle valve to the opening degree determined according to the slip value.

In the traction control systems having a sub-throttle valve the opening of which is controlled to converge the slip value of the driving wheels on a target slip value, the traction control system in accordance with the present invention is characterized in that the sub-throttle valve is moved to an initial opening when the slip value of the driving wheels exceeds a target slip value, the initial opening of the sub-throttle valve being predetermined fixed value when the opening of the main throttle valve at that time is not larger than a predetermined value and being a value substantially equal to the opening of the main throttle valve at that time when the opening of the main throttle valve at that time is larger than the predetermined value.

For example, when the opening of the main throttle valve at the time when the slip value of the driving wheels exceeds the target slip value is smaller than 50%, the sub-throttle valve is once moved to an opening of 50% (as the initial opening) and then the opening of the sub-throttle valve is controlled to converge the slip value of the driving wheels to the target slip value. On the other hand, when the opening of the main throttle valve at the time when the slip value of the driving wheels exceeds the target slip value is larger than 50%, the sub-throttle valve is once moved to an opening substantially equal to the opening of the main throttle valve at that time (as the initial opening) and then the opening of the sub-throttle valve is controlled to converge the slip value of the driving wheels to the target slip value.

With this arrangement, the response of the sub-throttle valve at the beginning of the traction control can be improved without giving rise to the problem that the amount of intake air is abruptly reduced in response to moving the sub-throttle valve to the opening degree determined according to the slip value when the opening of the main throttle valve is relatively small.

DESCRIPTION OF THE PREFERRED EMBODIMENT

Figure 1:
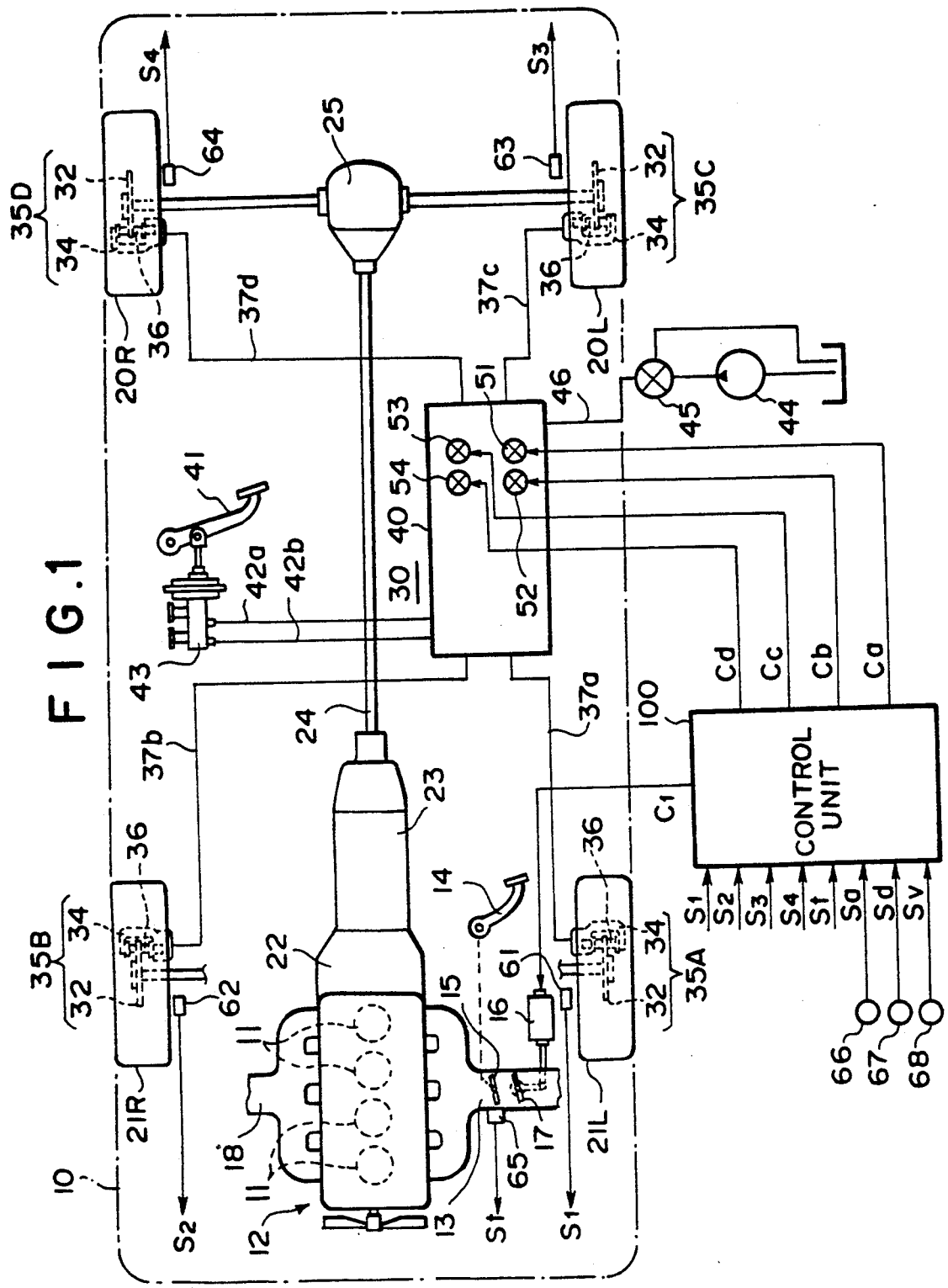
FIG. 1 is a schematic view showing a vehicle provided with a traction control system in accordance with an embodiment of the present invention.

In FIG. 1, an engine 12 is mounted on the front of a vehicle 10. The engine 12 has four cylinders 11, an intake passage 13 and an exhaust passage 18. A main throttle valve 15 which is interlocked with an accelerator pedal 14 and a sub-throttle valve 17 which is driven by a throttle actuator 16 are provided in the intake passage 13. The output torque of the engine 12 are transmitted to left and right rear wheels 20L and 20R by way of a power train which includes a torque convertor 22, an automatic transmission 23, a propeller shaft 24 and a differential 25. That is, in this particular embodiment, the rear wheels 20L and 20R are driving wheels. Left and right front wheels 21L and 21R which are driven wheels are disposed on opposite sides of the automatic transmission 23. A braking control section 30 includes disk brakes 35A to 35D which are respectively for the left front wheels 21L, the right front wheels 21R, the left rear wheels 20L and the right rear wheels 20R. Each of the disk brakes 35A to 35D comprises a disk 32 and a caliper 34 having thereon a brake pad. The caliper 34 is provided with a wheel cylinder 36. The wheel cylinders 36 for the respective disk brakes 35A to 35D are connected to a brake fluid pressure regulating section 40 through brake hoses 37a to 37d. The caliper 34 presses the brake pad against the disk 32 at a pressure proportional to the brake fluid pressure supplied from the brake fluid pressure regulating section 40 and brakes the corresponding wheel.

To the brake fluid pressure regulating section, a brake fluid pressure is supplied from a power cylinder 43 through conduits 42a and 42b according to depression of a brake pedal 41. Further a working fluid pressure produced by an pump 44 and a regulator valve 45 is supplied to the brake fluid pressure regulating section 40 through a conduit 46. The brake fluid pressure regulating section 40 normally produces a brake fluid pressure according to the depression of the brake pedal 41 and supplies it to the disk brakes 35A to 35D, and separately produces the brake fluid pressures to be supplied to the disk brakes 35C and 35D for the driving wheels as needed and supplies the same to the disk brakes 35C and 35D.

That is, the brake fluid pressure regulating section 40 has therein solenoid on-off valves 51 to 54. The on-off valves 51 and 52 are combined with each other and control the brake fluid pressure to be supplied to the disk brake 35C for the left rear wheel 20L, and the on-off valves 53 and 54 are combined with each other and control the brake fluid pressure to be supplied to the disk brake 35D for the right rear wheel 35D. When the valve 51 is opened with the valve 52 closed, the brake fluid pressure supplied to the brake 35C is increased, and when the valve 52 is opened with the valve 51 closed, the brake fluid pressure supplied to the brake 35C is reduced. When both the valves 51 and 52 are closed, the brake fluid pressure is fixed to the value at that time. Similarly, when the valve 53 is opened with the valve 54 closed, the brake fluid pressure supplied to the brake 35D is increased, and when the valve 54 is opened with the valve 53 closed, the brake fluid pressure supplied to the brake 35D is reduced. When both the valves 53 and 54 are closed, the brake fluid pressure is fixed to the value at that time.

A control unit 100 controls the throttle actuator 16 and the on-off valves 51 to 54. Detecting signals S1 to S4 of peripheral speed sensors 61 to 64 which respectively represent the peripheral speeds of the left front wheel 21L, the right front wheel 21R, the left rear wheel 20L and the right rear wheel 20R are input into the control unit 100. Further, a detecting signal St of a main-throttle opening sensor 65 which represents the opening of the main throttle 15, a detecting signal Sa of a accelerator position sensor 66 which represents the amount of depression of the accelerator pedal 14, a detecting signal Sd of a steering angle sensor 67 which represents the turning angle of the front wheels and a detecting signal Sv of a vehicle speed sensor 68 which represents the running speed of the vehicle are input into the control unit 100.

The control unit 100 reads the detecting signals Sa, Sd and Sv at predetermined intervals, and determines an estimated value of the friction coefficient of the road surface on the basis of the vehicle speed represented by the detecting signal Sv and the acceleration of the vehicle obtained by differentiating the vehicle speed according to a data map in which the vehicle speed and the acceleration of the vehicle are related to the friction coefficient of the road surface. The control unit 100 determines first and second basic target slip values on the basis of the estimated value of the friction coefficient of the road surface thus obtained referring to a data map in which the first and second basic target slip values are related to the friction efficient of the road surface, the first basic target slip value being for the traction control by control of the sub-throttle valve opening and the second basic target slip value being for the traction control by control of the braking force. Further the control unit 100 multiplies the first basic target slip value by correction coefficients which are determined respectively based on the vehicle speed, the amount of depression of the accelerator pedal and the turning angle of the front wheels represented by the detecting signals Sv, Sa and Sd, thereby determining a first target slip value STT for the traction control by control of the sub-throttle valve opening. Similarly, the control unit 100 multiplies the second basic target slip value by correction coefficients which are determined respectively based on the vehicle speed, the amount of depression of the accelerator pedal and the turning angle of the front wheels represented by the detecting signals Sv, Sa and Sd, thereby determining a second target slip value STB for the traction control by control of the braking force. The second target slip value STB is larger than the first target slip value STT.

The control unit 100 reads the detecting signals S1 to S4 at predetermined intervals, and detects that the driving wheels slip relative to the road surface and calculates the slip value SP on the basis of the difference between the average of the peripheral speeds of the left and right front wheels 21L and 21R (which are represented by the detecting signals S1 and S2) and the larger of the peripheral speed of the left rear wheel 20L and that of the right rear wheel 20R (which are represented by the signals S3 and S4). Further the control unit 100 detects that the left rear wheel slips relative to the road surface and calculates the slip value SPL on the basis of the difference between the average of the peripheral speeds of the left and right front wheels 21L and 21R and the peripheral speed of the left rear wheel 20L and detects that the right rear wheel slips relative to the road surface and calculates the slip value SPR on the basis of the difference between the average of the peripheral speeds of the left and right front wheels 21L and 21R and the peripheral speed of the right rear wheel 20R.

The control unit 100 compares the slip value SP of the driving wheels relative to the road surface with the first target slip value STT and when the former is not smaller than the latter, the control unit 100 causes the throttle actuator 16 to control the opening of the sub-throttle valve 17 so that the output torque of the engine 12 is reduced and the driving torque acting on the driving wheels (the left and right rear wheels 20L and 20R) is reduced, thereby converging the slip value SP on the first target slip value STT. Further the control unit 100 compares the slip value SPL of the left rear wheel 20L with the second target slip value STB and when the former is not smaller than the latter, the control unit 100 outputs valve driving signals Ca and Cb which cause the solenoid on-off valves 51 and 52 to apply the brakes 35C to the left rear wheel 20L so that the driving torque acting on the left rear wheel 20L is reduced and the slip value SPL falls below the second target slip value STB. The control unit 100 further compares the slip value SPR of the right rear wheel 20R with the second target slip value STB and when the former is not smaller than the latter, the control unit 100 outputs valve driving signals Cc and Cd which cause the solenoid on-off valves 53 and 54 to apply the brakes 35D to the right rear wheel 20R so that the driving torque acting on the right rear wheel 20R is reduced and the slip value SPR falls below the second target slip value STB.

The sub-throttle valve 17 is held in the fully open position where its opening degree is maximum when the traction control by control of the sub-throttle valve opening is not effected.

Figure 2A:
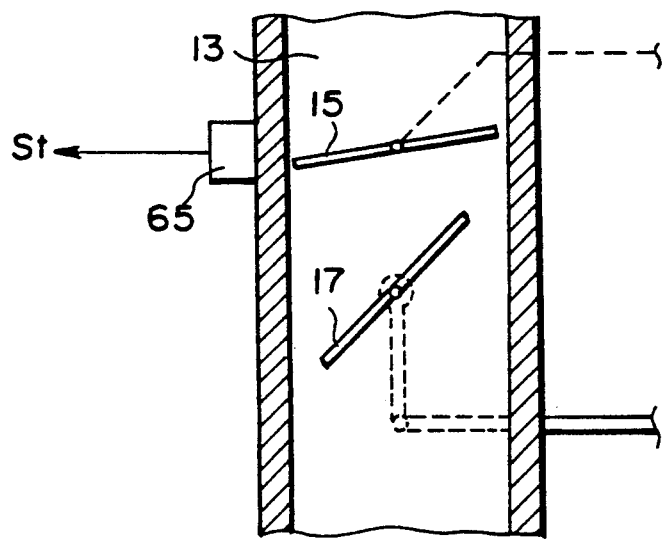
FIGS. 2A and 2B are views for illustrating the manner of determining the initial opening of the sub-throttle valve, FIG. 3 view for illustrating an example of the operation of unit.
Figure 2B:
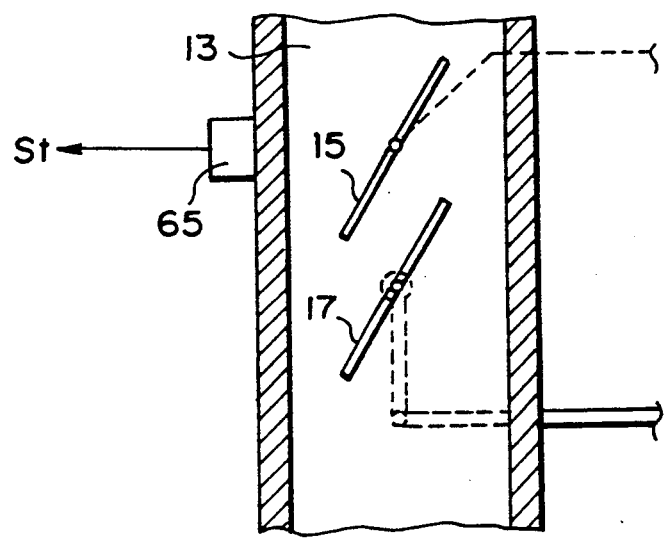

When the slip value SP becomes not smaller than the first target slip value STT while the sub-throttle valve 17 is held in the fully open position, the control unit 100 initiates the traction control and outputs a driving signal Ct which causes the throttle actuator 16 to move the sub-throttle valve 17 to an initial opening. When the opening of the main throttle valve 15 represented by the detecting signal St is smaller than 50%, the initial opening is set to be 50% as shown in FIG. 2A, and when the opening of the main throttle valve 15 is not smaller than 50%, the initial opening is set to be equal to the opening of the main throttle valve 15 as shown in FIG. 2B.

Subsequently the control unit 100 outputs a driving signal Ct which causes the throttle actuator 16 to move the sub-throttle valve 17 so that the slip value SP of the driving wheels converges on the first target slip value STT.

The traction control by control of the braking force is effected in addition to the traction control by control of the sub-throttle valve opening when the slip value SPL or SPR becomes not smaller than the second target slip value STB. An example of the operation of the control unit 100 when it effects the traction control by control of the sub-throttle valve opening will be described with reference to FIG. 3 wherein VW represents the peripheral speed of the wheel, MH represents the opening of the main throttle valve 15, SH represents the opening of the sub-throttle valve 17 and t represents the time.

Figure 3:
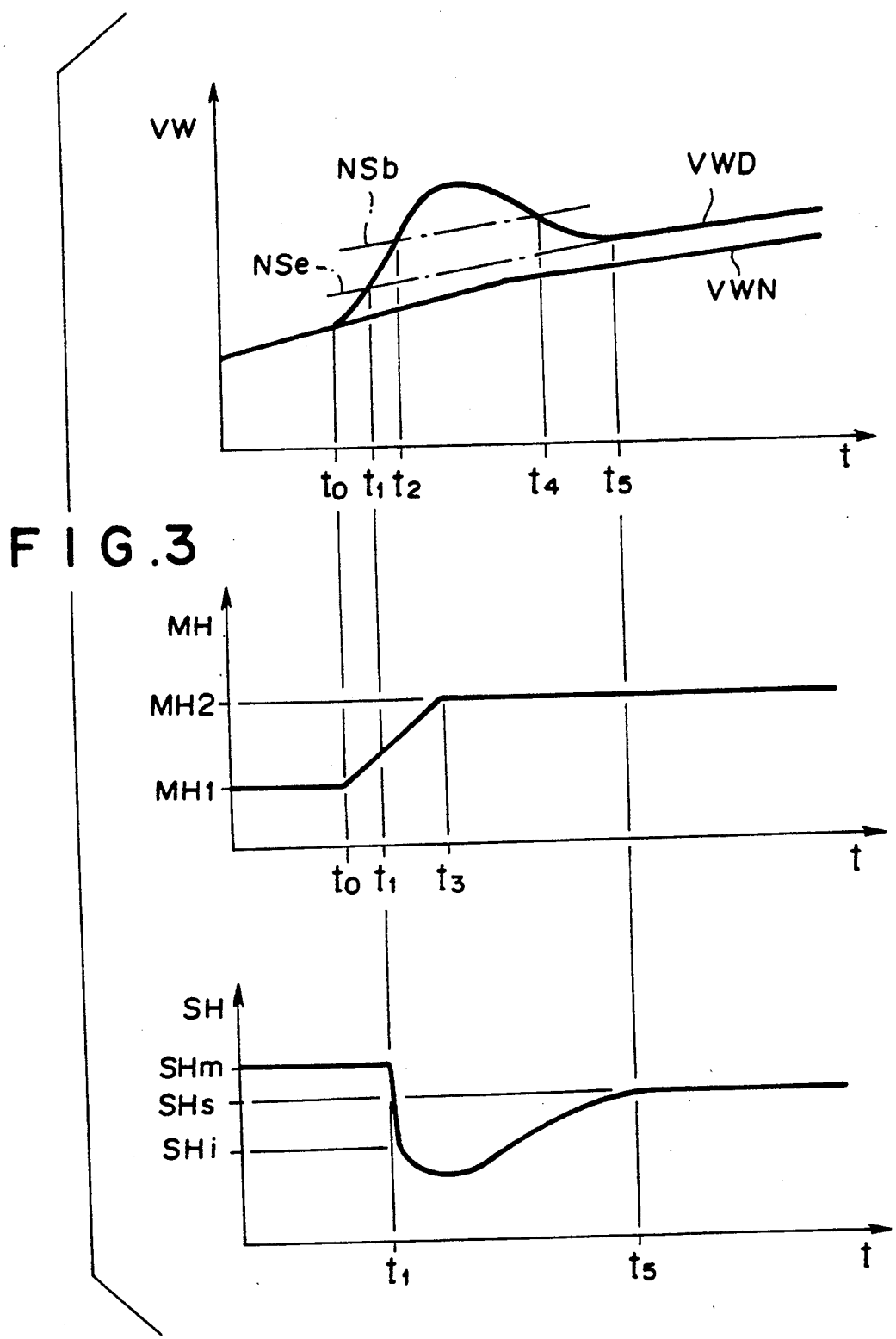

In FIG. 3, before time t0, the traction control is not effected and the opening MH of the main throttle valve 15 is kept at MH1, the average peripheral speed of the driven wheels VWN (will be referred to as "the average driven wheel speed VWN", hereinbelow) which is the average of the peripheral speeds of the left and right front wheels 21L and 21R is substantially equal to the peripheral speed of the driving wheels VWD (will be referred to as "the driving wheel speed VWD", hereinbelow) which is the larger of the peripheral speeds of the left and right rear wheels 20L and 20R, that is, the driving wheels do not slip relative to the road surface, and the sub-throttle valve 17 is held at the fully open position where its opening is at SHm.

When the accelerator pedal 14 is pushed down to accelerate the vehicle at time t0 and the opening MH of the main throttle valve 15 increases, the rear wheels 20L and 20R begin to slip relative to the road surface in response to upshift of the automatic transmission 23 and the driving wheel speed VWD becomes larger than the average driven wheel speed VWN. When the driving wheel speed VWD reaches, at time t1, a value NSe at which the slip value of at least one of the left and right rear wheels 20L and 20R becomes equal to the first target slip value STT, the control unit 100 initiates the traction control by control of the sub-throttle valve opening and moves the sub-throttle valve 17 to the initial opening SHi immediately after the time t1. The initial opening SHi is set to be 50% when the opening of the main throttle valve 15 is smaller than 50%, and to be equal to the opening of the main throttle valve 15 when the opening of the main throttle valve 15 is not smaller than 50% as described above.

When acceleration of the vehicle continues with the opening of the main throttle valve 15 continuing to increase until time t3 and the opening of the main throttle valve 15 is thereafter fixed at MH2, the driving wheel speed VWD once increases over the value NSe and then falls to the value NSe at time t5 by virtue of the traction control by control of the sub-throttle valve opening. After the time t5, the driving wheel speed VWD is substantially fixed at the value NSe where the slip of one of the left and right rear wheels 20L and 20R is substantially equal to the first target slip value STT. In the meantime, the opening of the sub-throttle valve 17 is changed from the initial opening SHi and is fixed at a value SHs between the maximum value SHm and the initial value SHi at the time t5 and thereafter.

The traction control by control of the braking force where the disk brake 35C and/or the disk brake 35D is applied is effected during the period between a time t2 at which the driving wheel speed VWD exceeds the second target slip value STB and a time t4 at which the driving wheel speed VWD falls to the second target slip value STB.

Figure 4:
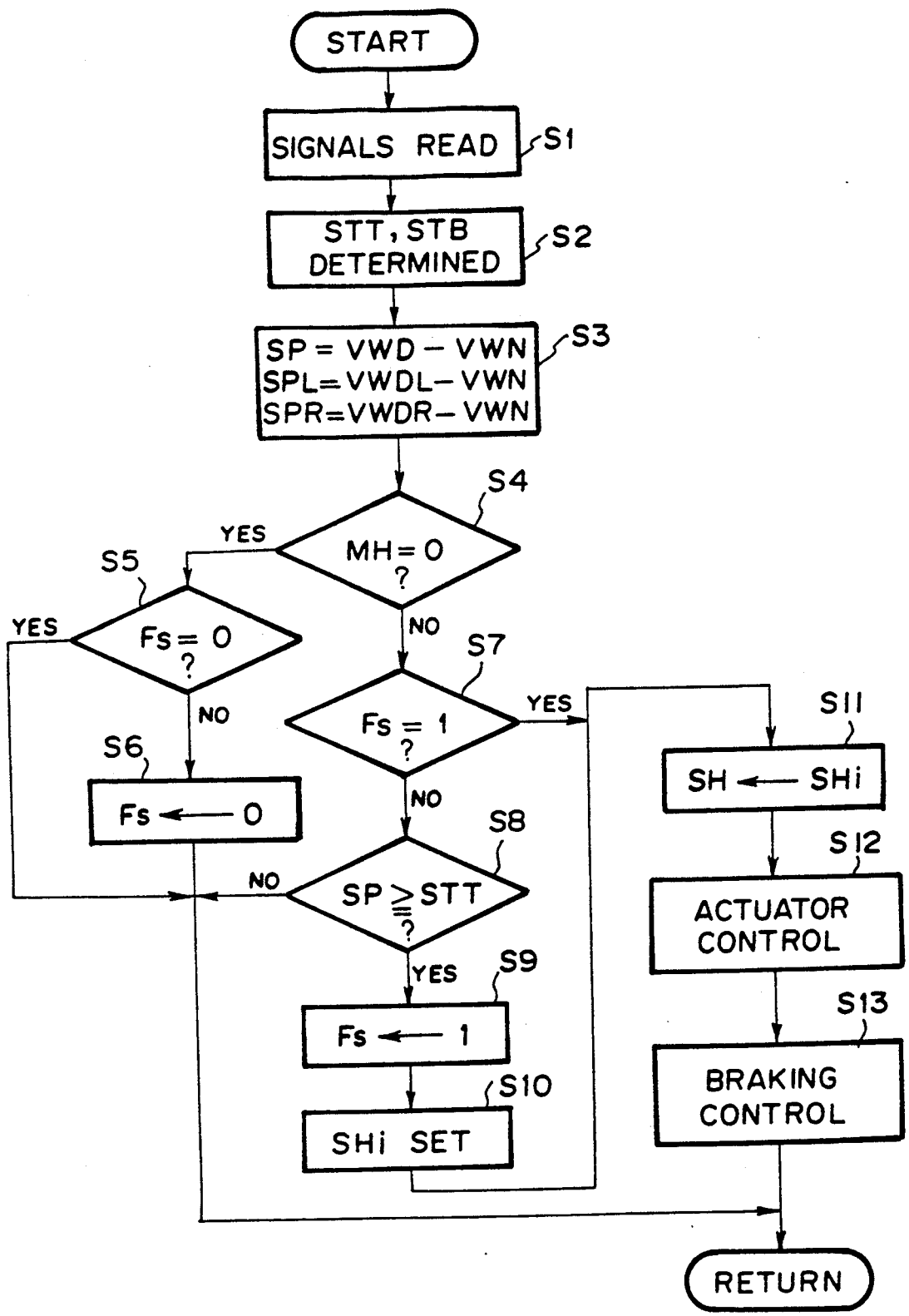
FIGS. 4 and 5 are flow charts for illustrating an example of the program which the control unit executes.

The control unit 100 which operates as described above may comprise a microcomputer, and an example of a program which the control unit 100 executes for the traction control will be be described with reference to FIG. 4, hereinbelow.

The control unit 100 first reads the detecting signals in step S1, and determines, in step S2, the first target slip value STT and the second target slip value STB in the manner described above.

Then, in step S3, the control unit 100 calculates the slip value of the driving wheels SP, the slip value of the left rear wheel SPL and the slip value of the right rear wheel SPR in the manner described above. (slip value SP=driving wheel speed VWD—average driven wheel speed VWN, slip value SPL=left driving wheel speed VWDL—average driven wheel speed VWN, slip value SPR=right driving wheel speed VWDR—average driven wheel speed VWN)

Then the control unit 100 determines in step S4 whether the opening MH of the main throttle valve 15 is 0, that is, whether the main throttle valve 15 is fully closed, on the basis of the detecting signal St, and when it is determined that the opening MH of the main throttle valve 15 is 0, the control unit 100 determines in step S5 whether traction control flag Fs is 0. When it is determined in step S5 that the traction control flag Fs is not 0, the control unit 100 returns to step S1 after setting the traction control flag Fs to 1 in step S6. Otherwise, the control unit 100 directly returns to step S1.

On the other hand, when it is determined in step S4 that the opening MH of the main throttle valve 15 is not 0, the control unit 100 determines in step S7 whether the traction control flag Fs is 1, and determines in step S8 whether the slip value of the driving wheels SP calculated in step S3 is not smaller than the first target slip value STT determined in step S2. When it is determined that the former is smaller than the latter, the control unit 100 returns to step S1. Otherwise, the control unit 100 sets the traction control flag Fs to 1 in step S9 and sets, in step S10, the initial opening SHi of the sub-throttle valve 17 in the manner described above.

Then in step S11, the control unit 100 outputs the driving signal Ct which causes the throttle actuator 16 to move the sub-throttle valve 17 to the initial opening SHi. Thereafter the control unit 100 outputs the driving signal Ct which causes the throttle actuator 16 to control the opening SH of the sub-throttle valve 17 so that the slip value of the driving wheels SP converges on the first target slip value STT. (step S12)

Further, the control unit 100 effects the traction control by control of the braking force on the basis of the slip values of the left and right rear wheels SPL and SPR calculated in step S3 and the second target slip value STB determined in step S3.

Figure 5:
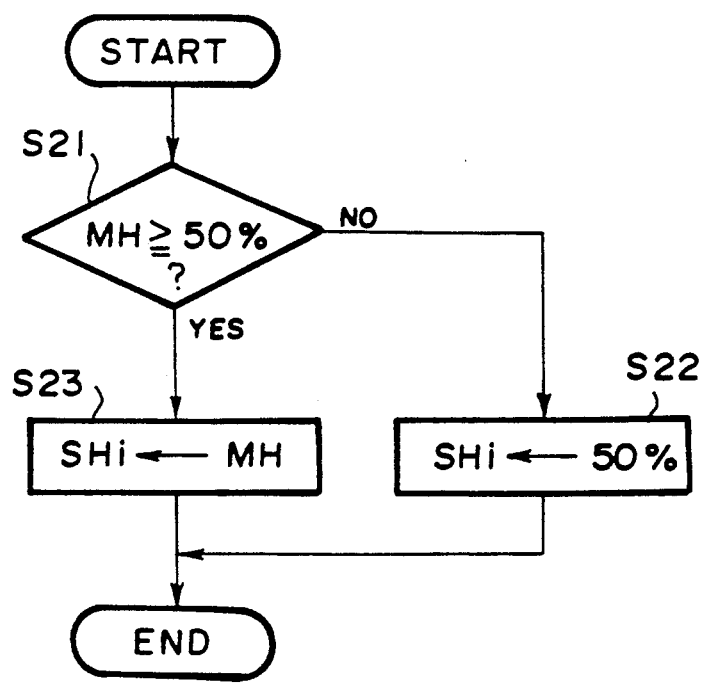

In step S10, the control unit 100 sets the intial opening SHi of the sub-throttle valve 17 in the manner shown in FIG. 5. The control unit 100 first determines whether the opening MH of the main throttle valve 15 is not smaller than 50% and sets the initial opening SHi of the sub-throttle valve 17 to 50% when the opening MH of the main throttle valve 15 is smaller than 50%. (steps S21 and S22) Otherwise, the control unit 100 sets the initial opening SHi of the sub-throttle valve 17 to a value equal to the opening MH of the main throttle valve 15 at that time. (step S23)

Now another embodiment of the present invention will be described with reference to FIGS. 6 and 7.

In this embodiment, initiation of the traction control by control of the sub-throttle opening is delayed for a predetermined time when the traction control is to be effected while the vehicle is running on a road having a large friction coefficient. When the traction control by control of the sub-throttle valve opening is effected, the engine output power is reduced and the engine output power takes a long time to recover after it is once reduced. Accordingly, it is preferred that the traction control by control of the sub-throttle valve opening be delayed when the traction control is to be effected while high engine output power is required, so that the engine output power can be quickly increased after the slip value of the driving wheels converges on the target slip ratio. When the traction control by control of the sub-throttle valve opening is delayed, the traction control by control of the braking force is effected earlier and accordingly, the degree of closure of the sub-throttle valve is reduced, whereby the engine output power can be quickly increased after the slip value of the driving wheels converges on the target slip ratio. Generally high engine output power is required when the vehicle is running on a road having a high friction coefficient or rough road, or the vehicle is running at a high speed or at a high engine speed.

The traction control by control of the sub-throttle valve opening may be delayed in various ways. For example, it can be delayed by initiating it a predetermined time after the condition for effecting the traction control by control of the sub-throttle valve opening is satisfied or by increasing the first target slip value.

Figure 6:
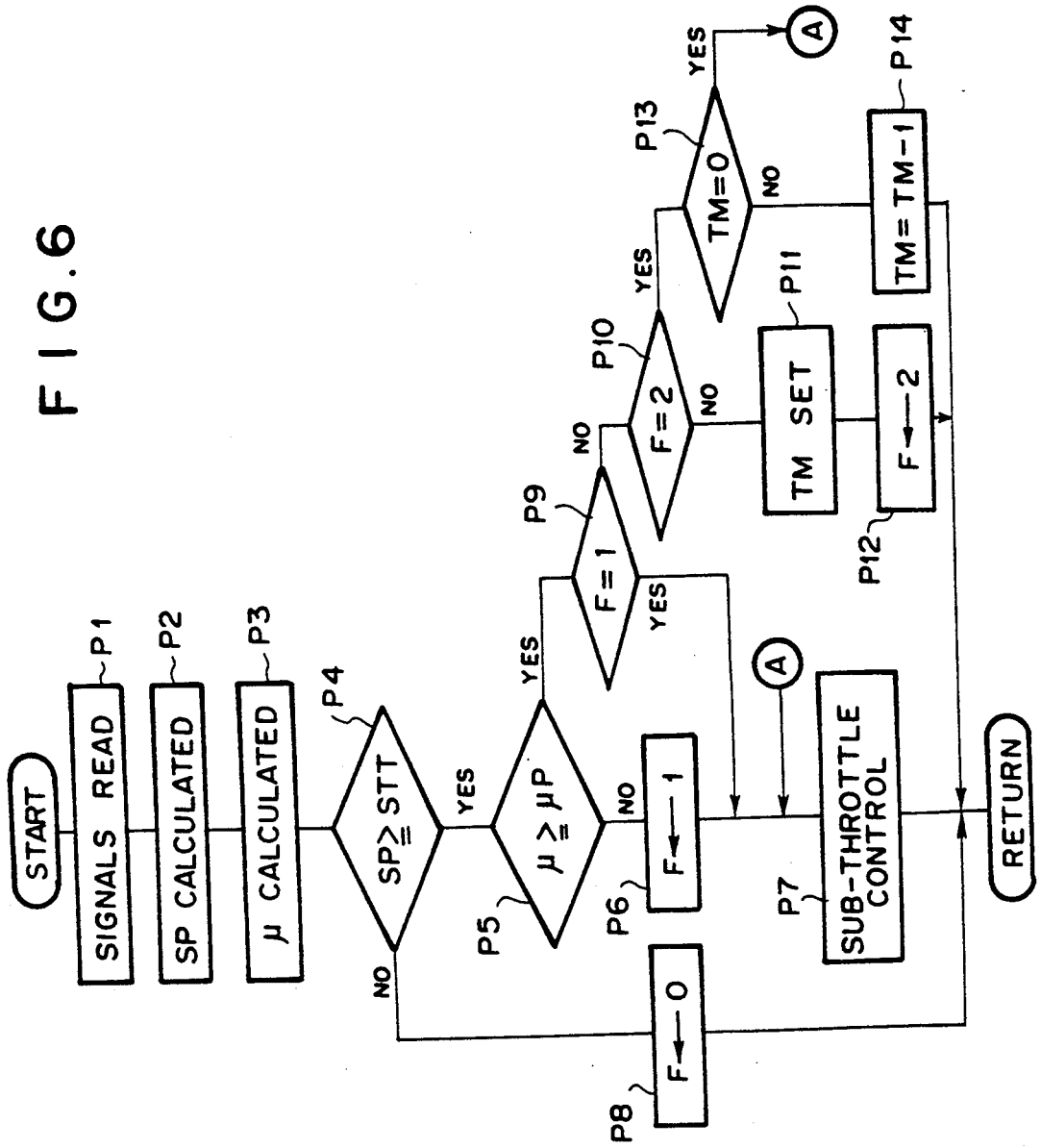
FIG. 6 is a flow chart for illustrating the operation of the control unit in a traction control system in accordance with another embodiment of the present invention.

In FIG. 6, the control unit 100 reads the detecting signals in step P1, and calculates the slip value of the driving wheels SP and the friction coefficient $\mu$ of the road surface. (steps P2 and P3) Then the control unit 100 determines in step P4 whether the slip value of the driving wheels SP is not smaller than the first target slip value STT. When it is determined that the former is smaller than the latter, the control unit 100 returns after setting flag F to 0 in step P8. Otherwise, the control unit 100 initiates the traction control by control of the sub-throttle valve opening. That is, the control unit 100 determines in step P5 whether the friction coefficient $\mu$ of the road surface is not smaller than a predetermined value $\mu$p. When it is determined that the former is smaller than the latter, the control unit 100 initiates controlling the sub-throttle valve 17 in step P7 after setting the flag F to 1 in step P6. That is, the control unit 100 initiates controlling the sub-throttle valve 17 as soon as the slip value of the driving wheels SP exceeds the first target slip value STT.

On the other hand, when the friction coefficient $\mu$ of the road surface is not smaller than a predetermined value $\mu$p, the control unit 100 initiates controlling the sub-throttle valve 17 a predetermined after the slip value of the driving wheels SP exceeds the first target slip value STT. That is, the control unit 100 determines in step P9 whether the flag F is 1. That the flag F is 1 shows that the control of the sub-throttle valve 17 has been initiated and the friction coefficient $\mu$ of the road surface exceeds the predetermined value $\mu$p during the control of the sub-throttle valve 17, and accordingly, when it is determined that the flag F is 1, the control unit 100 proceeds to step P7 and continues the control of the sub-throttle valve 17. When it is determined that the flag F is not 1, the control unit 100 determines in step P10 whether the flag F is 2. When it is determined that the flag F is not 2, the control unit 100 sets timer TM to a predetermined time in step P11, and then sets the flag F to 2 in step P12. Thereafter, the control unit 100 repeats steps P5, P9, P10, P13 and P14 until the predetermined time expires, and when the predetermined time expires, the control unit 100 proceeds to step P7 from step P13 and effects the control of the sub-throttle valve.

Figure 7:
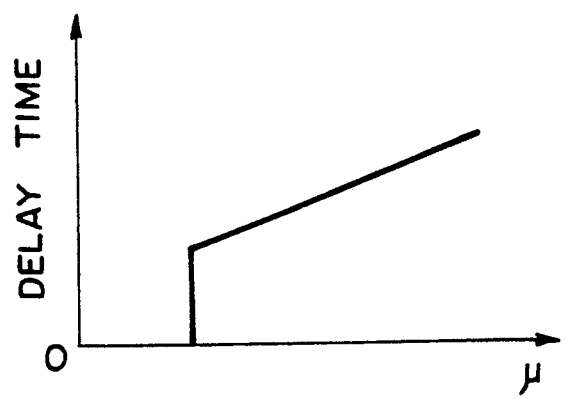
FIG. 7 is a view showing the relation between the time by which initiation of the control of the sub-throttle valve is delayed and the friction coefficient of the road surface.

The predetermined time by which the initiation of the control of the sub-throttle valve may be a fixed time irrespective of the value of the friction coefficient $\mu$ of the road surface or may be changed according to the value of the friction coefficient $\mu$ as shown in FIG. 7.

Though, in this embodiment, initiation of the traction control by control of the sub-throttle opening is delayed when the vehicle is running on a road having a high friction coefficient, it may be delayed when the vehicle is running rough road, or the vehicle is running at a high speed or at a high engine speed. How to detect that the vehicle is running on rough road is well known and will not be described, here.

We claim:

1. A traction control system for a vehicle having an engine comprising
   a slip detecting means which detects slip value of driving wheels of the vehicle relative to a road surface,
   a sub-throttle valve provided in an intake passage of the engine in series to a main throttle valve which is operatively connected to an accelerator pedal to open and close in response to operation of the accelerator pedal,
   a throttle opening detecting means which detects opening of the main throttle valve, and
   an engine output control means which controls opening of the sub-throttle valve to control the output of the engine so that the slip value of the driving wheels converges on a target slip value,
   wherein the improvement comprises that
   said engine output control means once moves the sub-throttle valve to an initial opening when the slip value of the driving wheels exceeds the target slip value and then controls the opening of the sub-throttle valve to control the output of the engine so that the slip value of the driving wheels converges on a target slip value, the initial opening being set to be a fixed value when the opening of the main throttle valve is not larger than a predetermined opening and to be substantially equal to the opening of the main throttle valve when the opening of the main throttle valve is larger than the predetermined opening, the fixed value being not smaller than the predetermined opening of the main throttle valve.

2. A traction control system as defined in claim 1 in which said predetermined opening of the main throttle valve is 50% and said fixed value is 50%.

3. A traction control system as defined in claim 1 which further comprises a braking control means which controls braking force applied to the driving wheels so that the slip value of the driving wheels converges on the target slip value when the slip value of the driving wheels exceeds a predetermined slip value larger than the target slip value and in which said engine output control means starts the control of the sub-throttle valve a predetermined time later than normal when the vehicle is running on a road having a large friction coefficient.

4. A traction control system as defined in claim 1 which further comprises a braking control means which controls braking force applied to the driving wheels so that the slip value of the driving wheels converges on the target slip value when the slip value of the driving wheels exceeds a predetermined slip value larger than the target slip value and in which said engine output control means starts the control of the sub-throttle valve a predetermined time later than normal when the vehicle is running on a rough road.

5. A traction control system as defined in claim 1 which further comprises a braking control means which controls braking force applied to the driving wheels so that the slip value of the driving wheels converges on the target slip value when the slip value of the driving wheels exceeds a predetermined slip value larger than the target slip value and in which said engine output control means starts the control of the sub-throttle valve a predetermined time later than normal when the vehicle is running at a high speed.

6. A traction control system as defined in claim 1 which further comprises a braking control means which controls braking force applied to the driving wheels so that the slip value of the driving wheels converges on the target slip value when the slip value of the driving wheels exceeds a predetermined slip value larger than the target slip value and in which said engine output control means starts the control of the sub-throttle valve a predetermined time later than normal when the engine speed is higher than a predetermined value.

* * * * *